United States Patent [19]

Duh

[11] 4,374,975

[45] Feb. 22, 1983

[54] PROCESS FOR THE PRODUCTION OF HIGH MOLECULAR WEIGHT POLYESTER

[75] Inventor: Ben Duh, Tallmadge, Ohio

[73] Assignee: The Goodyear Tire & Rubber Company, Akron, Ohio

[21] Appl. No.: 345,172

[22] Filed: Feb. 2, 1982

[51] Int. Cl.³ .............................................. C08G 63/70
[52] U.S. Cl. .................................... 528/272; 528/309; 528/483; 528/502; 528/503; 528/308.2
[58] Field of Search ............... 528/272, 309, 483, 502, 528/503

[56] References Cited

U.S. PATENT DOCUMENTS

| 3,031,433 | 4/1962 | Monroe | 528/310 |
|---|---|---|---|
| 3,405,098 | 10/1968 | Heighton et al. | 528/272 |
| 3,718,621 | 2/1973 | Wilson | 528/272 |
| 3,728,309 | 4/1973 | Maxion | 528/272 |
| 3,746,688 | 7/1973 | Berkau | 528/481 |
| 4,064,112 | 12/1977 | Rothe et al. | 528/272 |
| 4,161,578 | 7/1979 | Herron | 528/272 |
| 4,230,819 | 10/1980 | Hauenstein et al. | 528/483 |
| 4,231,991 | 11/1980 | Müller | 528/483 |

Primary Examiner—Lucille M. Phynes
Attorney, Agent, or Firm—Bruce Hendricks

[57] ABSTRACT

A process for the continuous production of high molecular weight polyethylene terephthalate wherein the crystallized prepolymer having an intrinsic viscosity of at least 0.3 is dried, preheated and polymerized in a single moving bed reaction zone. The method is characterized by an inert gas atmosphere and a reaction zone with a temperature gradiant ranging from about 170° C. at the uppermost portion and a higher temperature of about 225° C. at the lowermost portion.

3 Claims, 6 Drawing Figures

PROCESS FOR THE PRODUCTION OF HIGH MOLECULAR WEIGHT POLYESTER

BACKGROUND OF THE INVENTION

This invention relates to an improved process for the solid state polymerization of polyester. More particularly, the invention relates to a continuous solid state polymerization with a combined dryer-reactor stage.

Polymeric linear polyesters are those having fiber-forming properties and which are composed of a substantial portion (at least 85 percent by weight) of an ester of a dihydric alcohol and terephthalic acid. The polyesters are obtained by a polycondensation of terephthalic acid or an ester-forming derivative and glycol. Polyethylene terephthalate is the preferred polyester.

As known to those skilled in the art, polyesters are generally made in two stages. The first stage, or esterification stage, the diacid is reacted with a diol at elevated temperatures and pressures, with water being produced as a by-product. In the second stage, or polycondensation stage, the reaction is carried out until the intrinsic viscosity of the polymer melt reaches from about 0.20 or higher, for example, up to 0.80. At this time, the polymer melt is solidified by cooling and pelletized, or granulated, etc. The pellets are then subjected to a solid state polymerization reaction wherein a vacuum is applied at a temperature below the melting point of the partially formed polymer or prepolymer. Alternatively, the solid state polymerization can be accomplished by removal of the by-products, i.e. ethylene glycol and water, by passing an inert gas through the pellets or granules. Generally, the solid state polymerization is continued until the intrinsic viscosity, hereinafter referred to as I.V., reaches the desirable level, such as from 0.55 to 1.10, or even higher. It is known in the art that it is desirable at times to produce a polyester having an intrinsic viscosity of from 1.0 to about 1.2.

All measurements of I.V. were determined in a 60/40 phenol/tetrachloroethane mixed solvent at 30° C.

Polyester prepolymers contain up to 0.7 percent moisture. Moisture is a by-product of a polymerization reaction by esterification. It is known that by subjecting undried polyester to solid state polymerization conditions, it will cause severe depolymerization or degradation which is accompanied by a decrease in intrinsic viscosity and an increase in carboxyl number of the polymer. To address this problem, it is known in the art that one must dry the prepolymer. It has been a standard procedure to dry the prepolymer to 0.005 percent or lower moisture content in a dryer at about 160° C. or lower temperature before feeding it into the solid state polymerization reactor.

In the conventional continuous solid state polymerization process (See FIG. 1), the prepolymer is initially fed into a feed hopper (1). The prepolymer is then continuously fed to the crystallizer (2) in which the prepolymer is heated to about 160° C. and crystallized to prevent sticking in the latter part of the process. The crystallized polymer then enters the dryer (3). Inside the dryer, the polymer moves down by gravitational force and comes into contact counter-concurrently with a hot dehumidified air stream. A dehumidifier (19) and an air heater (4) are required to respectively lower the dew point of the air to below −34° C. and to heat the air to about 160° C. before entering the bottom of the dryer. The residence time of the polyester in the dryer is about 2.5 hours, during which its moisture content is reduced to below 0.005 percent. The dried polyester then leaves the dryer at about 160° C. and enters the preheater (5) in which the temperature is about 220° C., which is approximately the temperature of the reactor. The residence time of the polyester in the preheater is about 30 minutes. The preheated polyester then enters the moving bed solid state polymerization reactor (6) through the top. Once inside the reactor, the polyester moves downward slowly by gravitational force or by mechanical means while a stream of hot inert gas passes upward to sweep away the reaction by-products, including ethylene glycol, water and acetaldehyde. The conventional reactor is equipped with an oil jacket (7).

Figure 1:
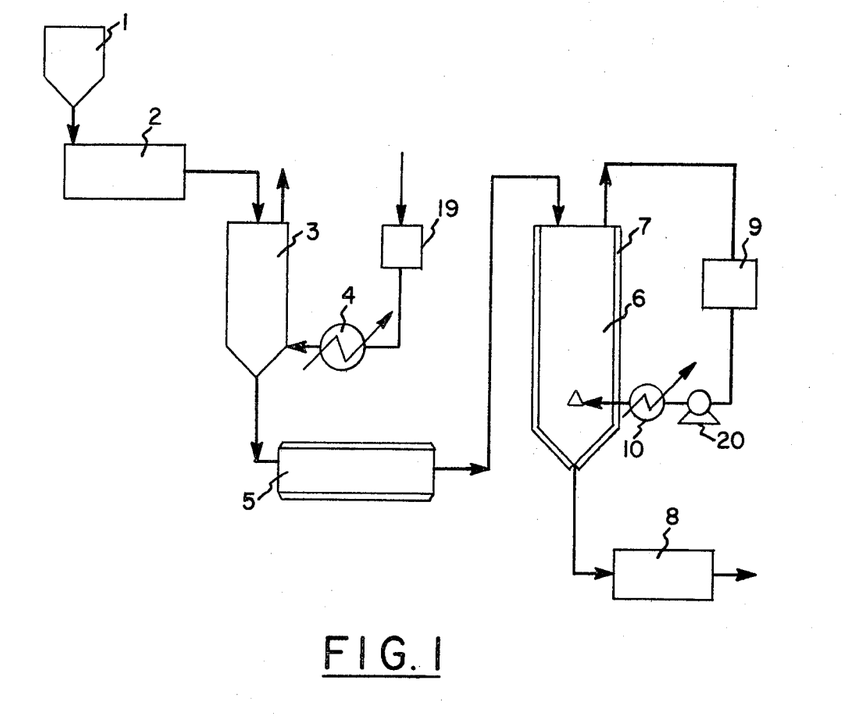
FIG. 1 is exemplary of a conventional system using a feed hopper, crystallizer, drier, preheater, moving bed reactor and product cooler.

The polyester inside the reactor is maintained at a near constant temperature by controlling the inlet temperature of the polyester, nitrogen or inert gas and hot oil at approximately the same value, which is about 220° C.

The polymer product with a sufficiently high I.V. is discharged through the bottom of the reactor into a cooler (8) where it is cooled below 65° C. so that it can be packaged and stored.

The nitrogen gas exiting the top of the reactor is about 220° C. and is contaminated with reaction by-products. It is then cooled and purified in the nitrogen clean up system (9) or air clean up system before being recycled to the bottom of the reactor.

The recycled gas can be fed into a heater (10) and blower mechanism (20) prior to entering the bottom of the reactor.

SUMMARY OF THE INVENTION

The present invention represents an advancement in the art in that a crystallized prepolymer can be dried, preheated and polymerized in a single moving bed reaction zone. Utilization of a single reaction zone is advantageous and desirable for several reasons. First, this enables one to minimize equipment size by eliminating a separate drier, preheater and solid state reactor. Second, there will be a savings by elimination of costly equipment. Third, a moisture level of 0.01 percent of the prepolymer can be tolerated without adverse effects during its polymerization. Finally, the improved process does not require an air dehumidifier.

BRIEF DESCRIPTION OF THE DRAWINGS

The invention is further illustrated by the accompanying drawings in which corresponding parts are identified by the same numerals and in which.

PREFERRED EMBODIMENTS OF THE INVENTION

There is disclosed a process of solid state polymerization of polyethylene terephthalate comprising introducing a crystalline prepolymer having an appreciable moisture content to a moving bed reaction zone, characterized by a temperature gradiant ranging from about 170° C. at the upper portion to about 225° C. at the lower portion, contacting said prepolymer within said zone with countercurrent flowing heated inert gas.

Figure 2:
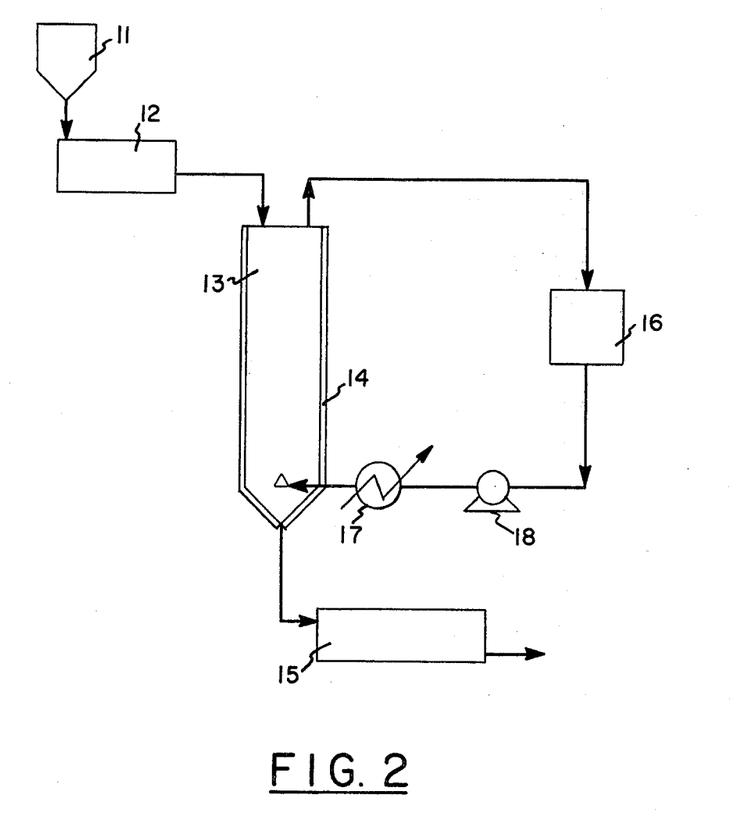
FIG. 2 is exemplary of a system using a feed hopper, crystallizer, moving bed reactor zone and product cooler.

The present invention is an improved process over the conventional one (See FIG. 2). As in the conventional process, the prepolymer is placed in a feed hopper (11) after which the prepolymer is heated and crystallized in a conventional crystallizer (12), but leaves the crystallizer at a higher temperature of about 170° C. to about 180° C. In the case of polyethylene terephthalate prepolymers, their sticking temperatures on stainless steel plates are typically of the order of about 230° C. after crystallization in contrast with the usual range of about 110° to 150° for the amorphous state. Such crystallization may desirably be performed by heating the resin at temperatures in the range of about 100° to 180° C. At the outset, the resin temperature is desirably kept somewhat below its original or amorphous sticking temperature to avoid adhesion, but a somewhat higher temperature may be employed after crystallization has progressed somewhat. While heating at 180° C. for as little as 5 or 10 minutes may induce crystallization in some of these resins, longer residence times are generally desirable when temperatures at the lower end of the range are used. Suitable time-temperature relationships are readily determined by observing the change in appearance of the particular resin or prepolymer selected from translucent to opaque as an indication of substantial crystal formation in the resin. The crystallized polyester then enters the moving bed reaction zone (13) through the top and moves downward slowly by a gravitational force. A stream of hot gas enters the reaction zone through the bottom at a constant temperature slightly higher than in the conventional process, 225° as opposed to 220° C. The hot gas then passes upward through the polyester located in the moving bed reactor zone. Since the polymer and the nitrogen enter the zone at greatly different temperatures, there will be an extensive heat exchange between the polymer and the gas. The temperature of the polyester is increased as it moves down and the temperature of the gas is decreased as it continues in its upward path. The polyester will leave the bottom of the zone at a temperature slightly lower than the nitrogen inlet temperature, at or about 220° C. The nitrogen will leave the top of the reaction zone at a temperature slightly higher than the polyester inlet temperature at or about approximately 185° C.

The hot oil in the jacket (14) of the reaction zone supplies heat to the prepolymer through the wall of the moving bed reaction zone.

As the polyester moves down from the top, its moisture content is gradually decreased and its temperature gradually increased. When the moisture content reaches a sufficiently high level, a net polymerization occurs. The polymerization reaction is continued until the intrinsic viscosity of the polyester reaches the desired value.

The polymer is then discharged into a product cooler (15) wherein the temperature of the polymer is lowered to about 65° C.

An inert gas serves to remove the undesirable reaction products from the solid state polycondensation reactor. Nitrogen is especially suitable for this purpose particularly because it contributes to the overall economy of the process because of its low price. Preferably the inert gas is recycled for economic reasons. Preferably, the recycled nitrogen has a water content of less than 250 mg/kg $N_2$, an ethylene glycol content of less than 10 mg/kg $N_2$, an oxygen content of less than 10 mg/kg $N_2$, and an acetaldehyde content of less than 100 mg/kg $N_2$. When the indicated water content is exceeded, hydrolytic effects, undesirable for the polymer may occur. If the ethylene glycol content in the inert gas reaches excessive high values, the reaction rate will be unfavorably effected. Elevated oxygen and aldehyde levels are undesirable since they may cause discoloration of the end product.

While the present description is concerned to a large extent with the polycondensation of polyethylene terephthalate prepolymer by reason of the commercial importance of this material and also to provide valid comparisons, the method is also suitable for the treatment of similar homopolymers and copolymers. These may be exemplified by the crystallizable homo- and copolymeric esters of terephthalic, chloroterephthalic, nitroterephthalic or hydrogenated terephthalic acids with one or more glycols, such as ethylene glycol, propylene glycol, 2,2-dimethyl-propanediol-1,3, 1,4-butane glycol and 1,4-cyclohexanedimethanol, as well as copolymers of the type which may be derived from one or more of those glycols and a plurality of acids comprising (1) substituted and unsubstituted terephthalic acids as just described and also (2) one or more of such acids as adipic, sebacic or 2,6-naphthalene dicarboxylic acids. For instance, suitable copolyesters may be prepared from terephthalic acid and a mixture of ethylene glycol and 2,2-diemthylpropanediol-1,3 or from ethylene glycol and a mixture of a major proportion of terephthalic acid and a minor proportion of isophthalic acid. It will be appreciated that the polyesters involved here are not limited to those prepared from such glycols and acids per se, for other preparatory methods are usually suitable as exemplified by the esterification of terephthalic acid with alkylene oxides, such as ethylene oxide, or the transesterification of dimethyl terephthalate with ethylene glycol.

The inert gas can optionally be recycled by using a conventional clean up system (16). The recycled gas can then be fed into a heater (17) before entering a blower mechanism (18) whereupon the gas then enters the drier reactor (14). Preferably the recycled gas can enter the blower (18) before entering the heater (17) whereupon the recycled gas enters the drier reactor (14).

The improved process of the present invention is set forth and exemplified in the following examples.

EXAMPLE 1

Figure 3:
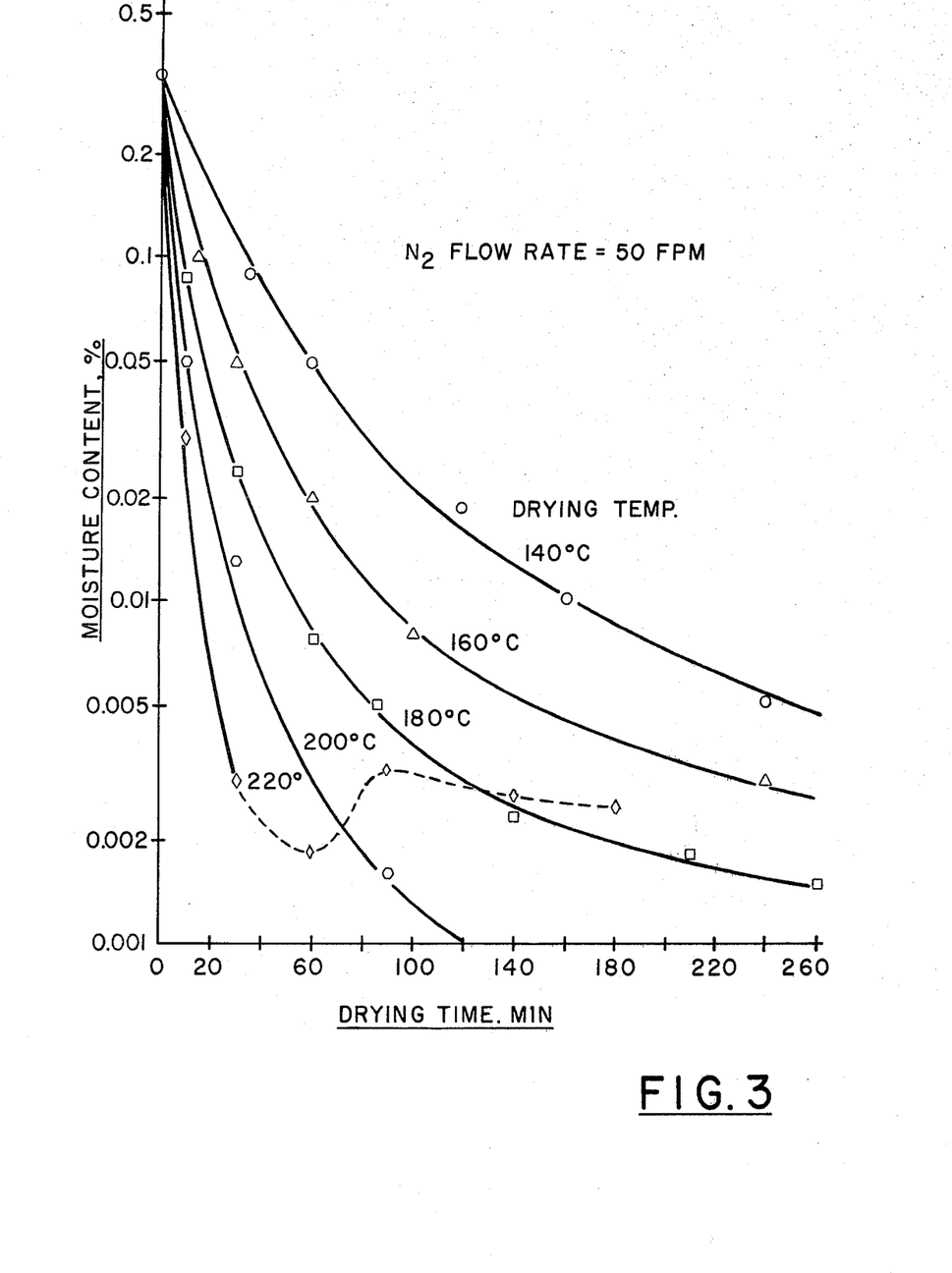
FIG. 3 is a graph showing effect of temperature on drying rate of polyester resin.
Figure 4:
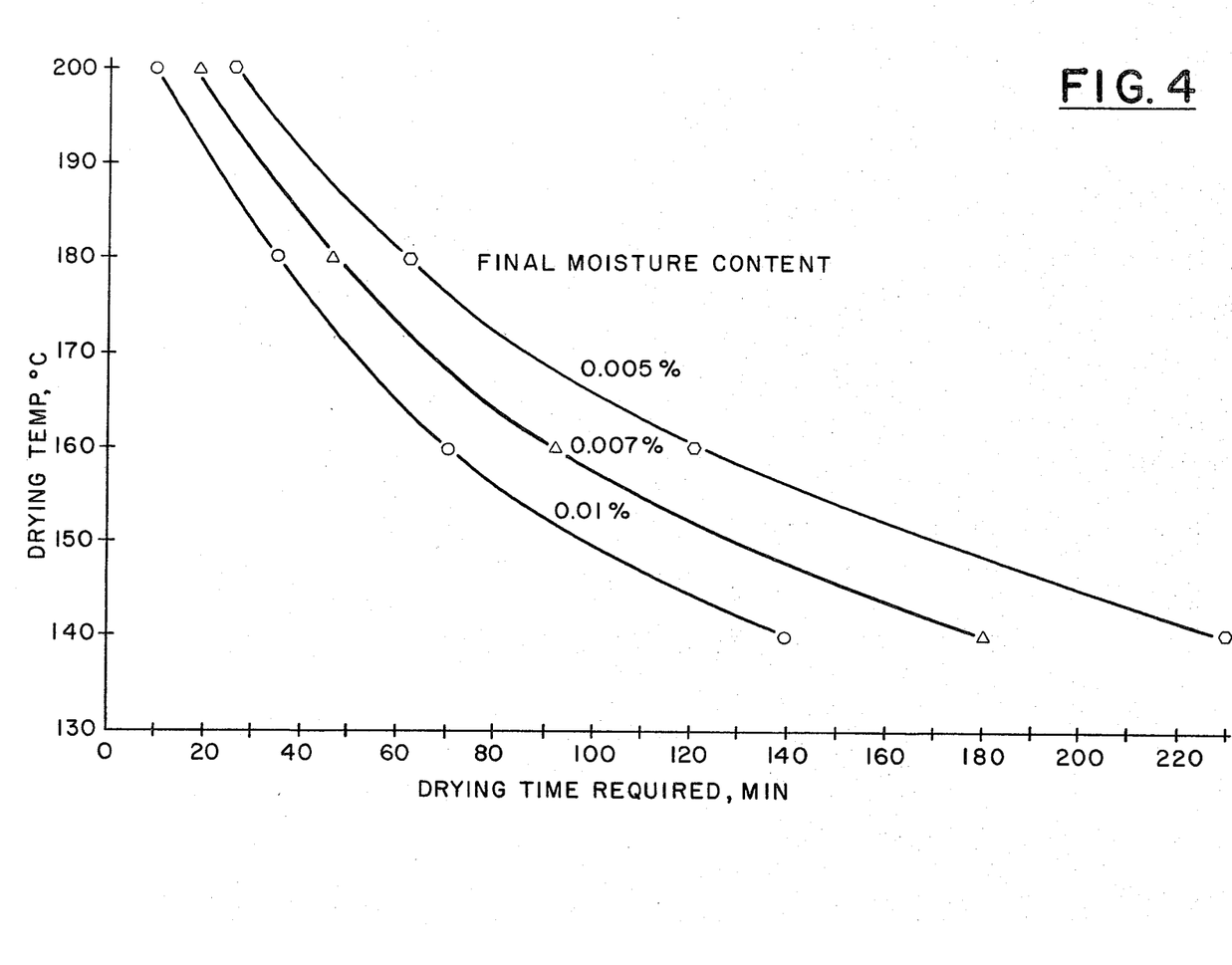
FIG. 4 is a graph showing effect of drying temperature on drying time requirement for polyester resin.

To evidence the effect of temperature on drying rate the following experiment was conducted. It is known that drying of PET is purely a diffusion process if the drying temperature is not high enough to cause reaction. The drying rate is therefore proportional to the diffusity of moisture inside the polymer and the difference between the moisture content and the equilibrium moisture content of the polymer. Since the diffusity of moisture increases and the equilibrium moisture content of the PET decreases with increasing temperature, the drying rate of PET can be increased by increasing the drying temperature. The PET prepolymer used in this experiment has an I.V. of 0.575 dl/g and a carboxyl number of 38 eq/$10^6$ g. The prepolymer is of cube shape with sides of about ⅛ inch through. Nitrogen with a dew point of about −75° F. was used as the drying medium. The dryer reaction zone was of varying temperatures to evidence the effect of temperature on drying rate. The temperatures ranged from 140° C. to 220° C. and the measurements were taken at increments of 20° C. The nitrogen flow rate was fixed at 50 feet per minute (fpm). When the temperature of the zone was fixed at the desired level and the nitrogen flow rate was stabilized at 50 fpm, 20 parts of PET with an initial moisture content of 0.35 percent was charged into the zone to start the drying cycle. Samples were taken at suitable intervals throughout the run to monitor the moisture content of the sample. The results from this experiment can be seen in FIG. 3. The data was used to plot the drying time requirement curve for 3 final moisture contents, 0.01, 0.007 and 0.005 percent (FIG. 4). It can be seen that the drying time required decreases drastically with increasing drying temperature.

EXAMPLE 2

Figure 5:
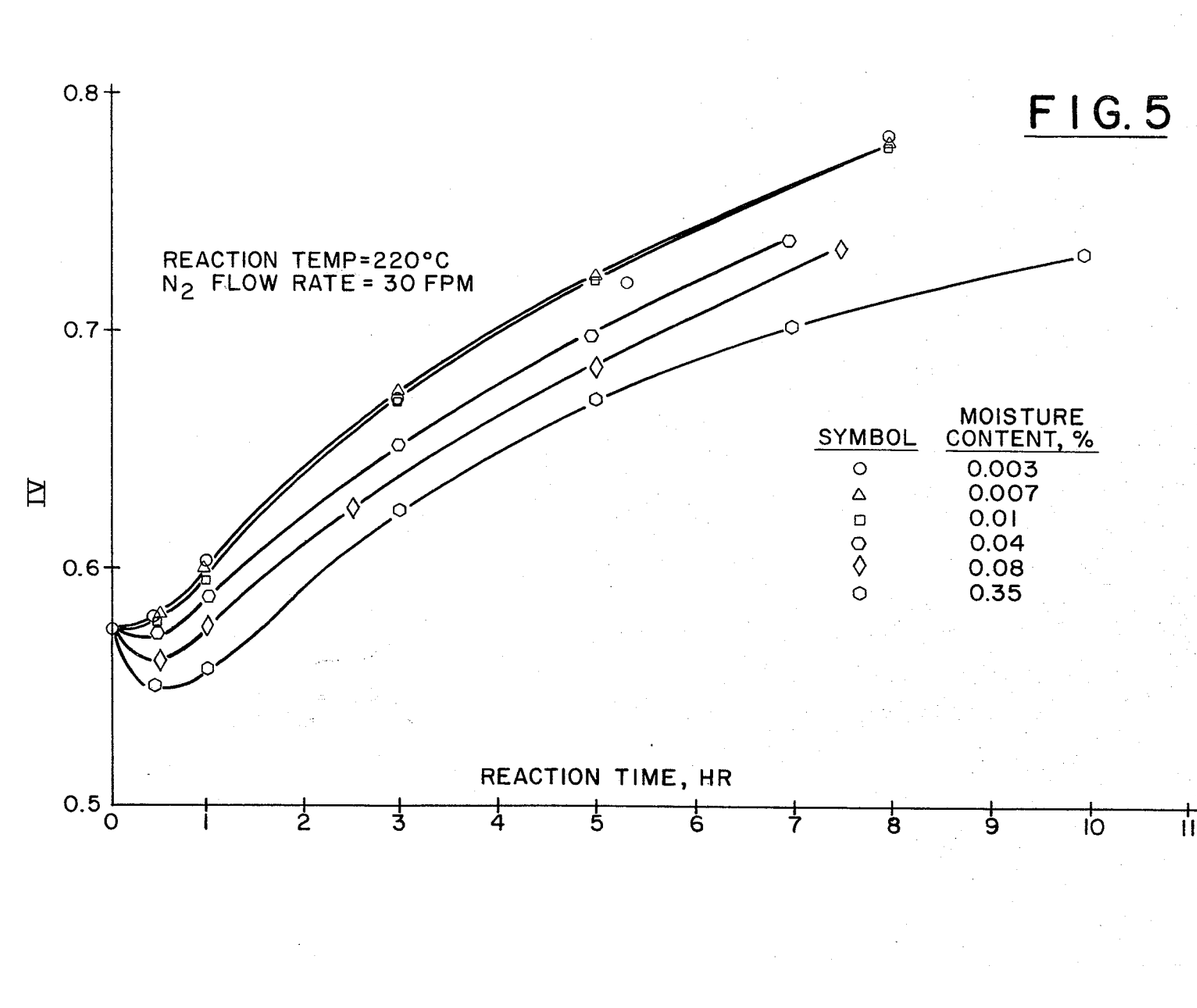
FIG. 5 is a graph showing effect of prepolymer moisture content on solid state polymerization of polyester resin.
Figure 6:
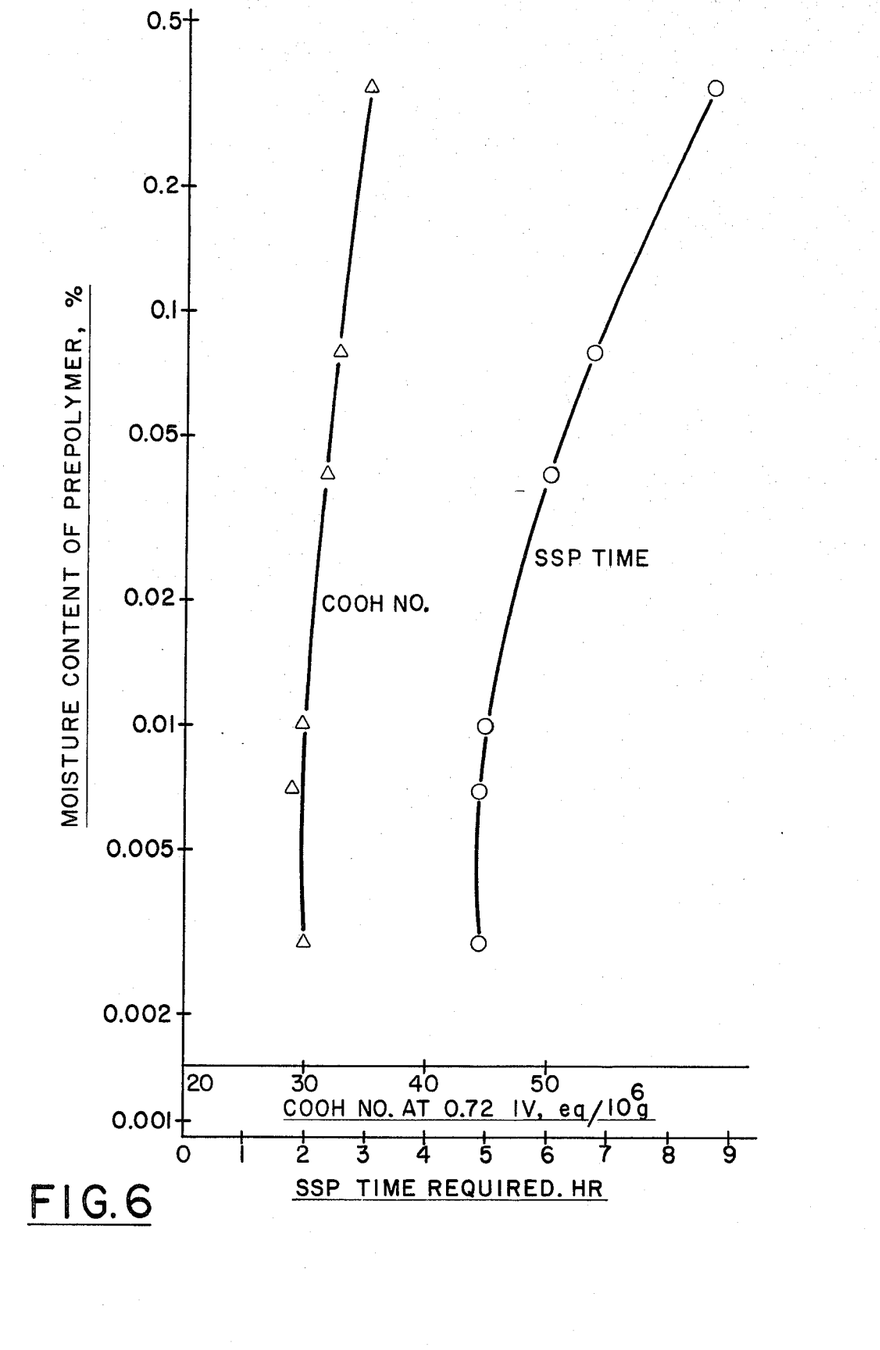
FIG. 6 is a graph showing effect of prepolymer moisture content on solid state polymerization time requirement and product carboxyl number.

The following example was run to show the effect of prepolymer moisture content on solid state polymerization to establish limits for satisfactory processing. A PET prepolymer with an I.V. of 0.575 dl/g and a carboxyl number of 38 eq/$10^6$ g was used in the following experiment. The prepolymer was cube shape with ⅛ inch sides. The polymerization zone was of the static bed reactor type. The PET used had various moisture content ranging from a 0.003 to 0.35 percent. The drying temperature used to obtain the desired moisture content in each run was fixed at 140° C. At this relatively mild temperature no degradation took place during the drying period. When the desired moisture content was achieved, the prepolymer was transferred into the solid state polymerization zone in which the temperature was controlled at 220° C. The nitrogen flow rate through the static bed reactor zone was fixed at 30 fpm. FIG. 5 shows the I.V. build-up curves for prepolymers with various moisture contents. There were I.V. decreases during the early parts of the SSP runs with prepolymers containing 0.04 percent or more moisture, indicating degradation caused by the presence of moisture in the prepolymer. FIG. 6 shows the effects of prepolymer moisture content on solid state polymerization time requirement and the carboxyl number of 0.72 dl/g I.V. product. The figure shows that the solid state polymerization time requirement and product number increased with increasing prepolymer moisture content. Although the effects level off at about 0.007 percent moisture content, the improvements in solid state polymerization time requirement and product carboxyl number are minimal when the moisture content is reduced below 0.01 percent. Considering the additional time required to further dry the prepolymer from 0.01 percent to 0.007 percent moisture content, 0.01 percent is considered to be the preferred moisture content for the prepolymer. This unexpectedly is a two-fold increase than the 0.005 percent moisture content which is widely considered to be the maximum moisture content limit for solid state polymerization.

EXAMPLE 3

The following example was conducted to evidence the effect of drying temperature and drying medium on prepolymer properties. Although the drying rate of PET increases with increasing drying temperature, there is a temperature limit at which PET can be dried without significant degradation. The use of air as the drying medium in commercial drying of the PET further adds another factor in determining the safe drying temperature limit. For this example, the prepolymer (with an I.V. equal to 0.575 dl/g and a carboxyl number of 38 eq/$10^6$ g) was dried to a moisture content of 0.01 percent. Various temperatures were used with nitrogen and dry air as the drying mediums. The dry air had a dew point equal to −80° F. The results are listed in Table 1. The results can be summarized as follows:

PET can be dried with nitrogen or air at temperatures up to about 180° C. without significant effects on prepolymer I.V. and carboxyl number. Drying PET at higher temperatures caused a decrease in I.V. and an increase in the carboxyl number of the feed polymer due to degradation, which appeared to worsen when air instead of nitrogen was used as the drying medium.

In the presence of nitrogen, only hydrolytic degradation may take place. In the presence of air, both hydrolytic and oxidative degradations may take place. Both types of degradations lead to a decrease of I.V. and an increase in carboxyl number. As can be seen from Table 1, PET can be dried with nitrogen or air at temperatures up to 180° C. without significant effects on its I.V. and carboxyl number. Unexpectedly, this is much higher than the 160° C. which is considered to be the maximum safe drying temperature.

EXAMPLE 4

The following example was conducted to show the effects of drying temperature and drying medium on solid state polymerization time requirement and solid state polymerization product properties. The same prepolymer as Example 3 was dried at various temperatures with nitrogen and air. The dried prepolymers were then solid state polymerized at 220° C. with nitrogen as the carrier gas to study the effects of drying temperature and drying media on solid state polymerization time requirement and solid state polymerization product properties. The results of the following experiment are listed in Table 2. The results of Table 2 generally parallel those listed in Table 1. The data evidences the fact that PET could be dried with either nitrogen or air at temperatures up to 180° with no or little effect on SSP time requirement and product carboxyl number. The longer SSP time required and the higher carboxyl numbers for the SSP products obtained with the prepolymers dried at 200° C. or higher temperatures, reflected the degradation during drying. Air drying at 200° C. or higher temperatures significantly increase the SSP time requirement and the product carboxyl number indicating more severe degradation during drying.

Table 2 summarizes the effect with various constant drying temperatures. While drying at 180° C. (with either nitrogen or air) gives the shortest total process time without significantly decreasing the product quality, the total process time and product carboxyl for this run are closely matched by those for the run with prepolymer dried at 200° C. with nitrogen. This teaches that an even shorter total process time may be obtainable without significant sacrifices in product quality by drying the prepolymer with a progressively increasing temperature schedule and with nitrogen as the drying medium.

EXAMPLE 5

Since hydrolytic degradation of PET during drying depends on both moisture content and temperature, one can gradually increase the temperature from a starting drying temperature to the SSP temperature during the drying period without a significant decrease in I.V. or even with a slight increase in I.V. The following example confirms this. Various initial temperatures were used in the following experiment. Various temperatures included 170° C., 180° C., 190° C. and 220° C. In all runs, nitrogen was used as the drying medium as well as the carrier gas for the solid state polymerization. In each run, the PET was charged into the zone with a heating bath controlled at the desired initial drying temperature. The temperature was then raised at the rate of 1° C./per minute until it reached 220° C. and then held there throughout the rest of the run. The heat up period will be defined as the drying period, and thereafter, the SSP period. For a heat up rate of 1° C. per minute, there will be some net depolymerization during the drying period if the starting temperature is 190° C. or higher and some net polymerization if the starting temperature is 180° C. or lower. A starting temperature of 180° C. gives the shortest total process time and satisfactory product quality. This example demonstrates the feasibility of a combined drying reaction zone for solid state polymerization of PET. Results can be seen in Table III.

TABLE III
EFFECT OF STARTING DRYING TEMPERATURE ON SOLID STATE POLYMERIZATION OF PET

| Starting Temp, °C. | PET Properties at End of Drying Period | | Total Process Time Required to Obtain Product with 0.72 dl/g IV, hr | Product COOH No, eq/10$^6$ g |
|---|---|---|---|---|
| | IV, dl/g | COOH No eq/10$^6$ g | | |
| 170 | 0.580 | 37 | 5.63 | 30 |
| 180 | 0.576 | 38 | 5.57 | 31 |
| 190 | 0.572 | 38 | 6.12 | 32 |
| 200 | 0.565 | 40 | 7.33 | 34 |

EXAMPLE 6

To practice the present invention in a continuous process, one would introduce a crystalline prepolymer of polyethylene terephthalate characterized by an I.V. of from 0.3 to 0.7 into a single moving bed reaction zone. The reaction zone has an upward flow of nitrogen gas wherein the gas has a water content of less than 100 mg/kg $N_2$ and an oxygen level of less than 10 mg/kg $N_2$. The temperature of the incoming nitrogen gas is about 225° C.

The moving bed reactor zone has an oil jacket. The hot oil in the jacket of the reaction zone supplies heat to the prepolymer through the wall of the moving bed reactor zone.

After the crystalline prepolymer is introduced at a temperature of about 180° C. into the top of the moving bed reaction zone where the temperature is about 180° C., the prepolymer falls by gravitational force to the bottom of the moving bed reactor zone. The temperatures at the bottom of the bed is about 225° C.

TABLE I
Effects of Drying Temperature and Drying Medium on Drying Time Requirement and Properties of a Prepolymer

| Drying Temp. °C. | Drying Medium | Time Required to Dry to 0.01% Moisture Content min | Prepolymer Properties at 0.01% Moisture Content | | | | | |
|---|---|---|---|---|---|---|---|---|
| | | | IV | COOH No eq/10$^6$ g | Acetaldehyde Content, ppm | Rd | a | b |
| 140 | $N_2$ | 160 | 0.577 | 38 | 78.7 | 47.3 | −1.6 | 0.5 |
| 140 | Air | 160 | 0.576 | 38 | 69.7 | 48.6 | −1.7 | 0.6 |
| 160 | $N_2$ | 90 | 0.574 | 38 | 53.8 | 49.4 | −1.6 | 0.2 |
| 160 | Air | 90 | 0.575 | 38 | 59.1 | 49.4 | −1.6 | 0.2 |
| 180 | $N_2$ | 55 | 0.574 | 39 | 52.0 | 50.8 | −1.7 | 0.3 |
| 180 | Air | 55 | 0.577 | 38 | 46.0 | 49.9 | −1.7 | 0.5 |
| 200 | $N_2$ | 30 | 0.565 | 40 | 40.8 | 51.8 | −1.5 | 0.0 |
| 200 | Air | 30 | 0.561 | 44 | 40.6 | 51.5 | −1.7 | 0.3 |

Prepolymer:
IV = 0.575
COOH No = 38 eq/10$^6$ g
b Color (amorphous) = 1.9

TABLE II
Effects of Drying Temperature and Drying Medium on SSP Time Required and 0.72 IV SSP Product of Polyethylene Terephthalate

| Drying Temp. °C. | Drying Medium | SSP Time, Hr | SSP Time and Drying Time, Hr | COOH No eq/10$^6$ g | Acetaldehyde Content, ppm | Color | | |
|---|---|---|---|---|---|---|---|---|
| | | | | | | Rd | a | b |
| 140 | $N_2$ | 5.1 | 7.77 | 30 | 3.0 | 52.1 | −1.7 | 0.1 |
| 140 | Air | 5.2 | 7.87 | 28 | 2.5 | 52.4 | −1.7 | 0.2 |
| 160 | $N_2$ | 5.2 | 6.70 | 30 | 2.9 | 52.7 | −1.6 | 0.2 |
| 160 | Air | 5.1 | 6.60 | 29 | 2.5 | 52.9 | −1.7 | 0.4 |
| 180 | $N_2$ | 5.1 | 6.02 | 30 | 2.2 | 52.5 | −1.7 | 0.4 |
| 180 | Air | 5.1 | 6.02 | 31 | 2.4 | 52.8 | −1.7 | 0.6 |
| 200 | $N_2$ | 5.6 | 6.10 | 32 | 2.8 | 53.7 | −1.6 | 0.4 |
| 200 | Air | 6.2 | 6.70 | 34 | 2.0 | 53.9 | −1.7 | 0.9 |
| 220 | $N_2$ | 8.45 | 8.75 | 35 | — | — | — | — |

The polyester product is then discharged and cooled after a residence time period sufficient to raise the intrinsic viscosity to the desired level.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the continuous solid state polymerization of crystalline linear polyester prepolymer wherein the crystalline polyester is further polymerized, the improvement comprising introducing a crystalline linear polyester prepolymer having an appreciable moisture content to a single moving bed reaction zone, countercurrently contacting said polyester within the reaction zone with a heated inert gas wherein the temperature of the crystalline polyester is increased from about 170° C. to its polymerization temperature of about 200° C. to 225° C. whereby said polyester is further polymerized in its crystalline form without severe degradation of the polyester.

2. A method for the solid state polymerization of polyester resins comprising heating a crystallized prepolymer into a single moving bed reaction zone for a time sufficient to dry and solid state polymerize the polyester to a desirable I.V. wihtout severe degradation due to a high moisture content of the polyester, wherein there is a temperature gradiant of from 170° C. at the uppermost section to about 225° C. at the lowermost section.

3. A method for the solid state polymerization of polyethylene terephthalate comprising feeding a crystalline polyethylene terephthalate characterized by an I.V. of at least 0.3 and an initial moisture content of up to 0.35 percent by weight, into a single moving bed reaction zone wherein said zone there is a counter-current flow of hot inert gas and there is a temperature gradiant of from about 170° C. at the upper most section of said zone and from about 225° C. at the lower most section of said zone.

* * * * *